C. E. BROWN.
CARBON REMOVER.
APPLICATION FILED AUG. 22, 1918.

1,283,649.

Patented Nov. 5, 1918.

Witness
F. L. Search

Inventor,
Carl E. Brown
By C. A. Snow & Co.
Attorneys.

UNITED STATES PATENT OFFICE.

CARL E. BROWN, OF COLUMBUS, OHIO.

CARBON-REMOVER.

1,283,649.  Specification of Letters Patent.  Patented Nov. 5, 1918.

Application filed August 22, 1918. Serial No. 251,042.

*To all whom it may concern:*

Be it known that I, CARL E. BROWN, a citizen of the United States, residing at Columbus, in the county of Franklin and State of Ohio, have invented a new and useful Carbon-Remover, of which the following is a specification.

By way of explanation it may be stated, that as is known in the art, if a small quantity of water be introduced into the generator of a burner, while the burner is hot, the carbon deposit in the generator will be removed.

The present invention aims to provide an exceedingly simple means whereby water may be introduced into the generator as aforesaid.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
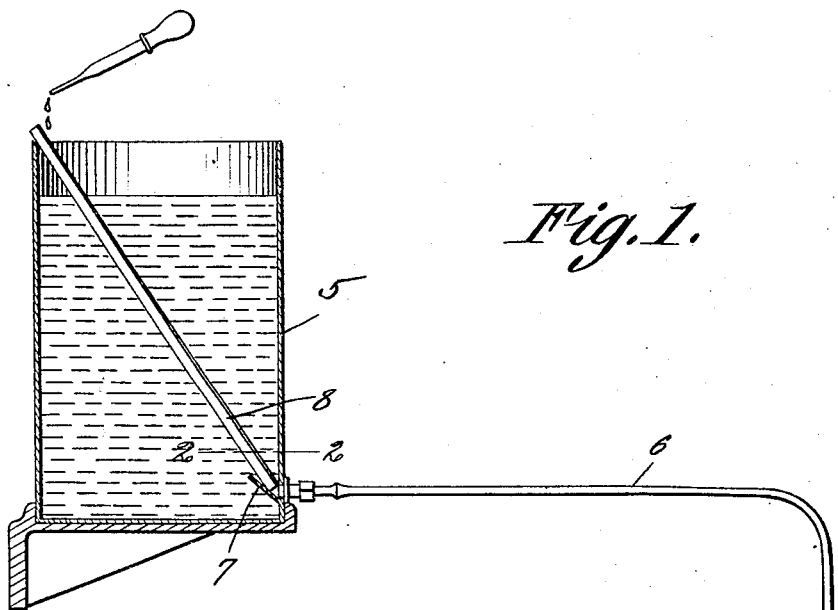
Figure 2:
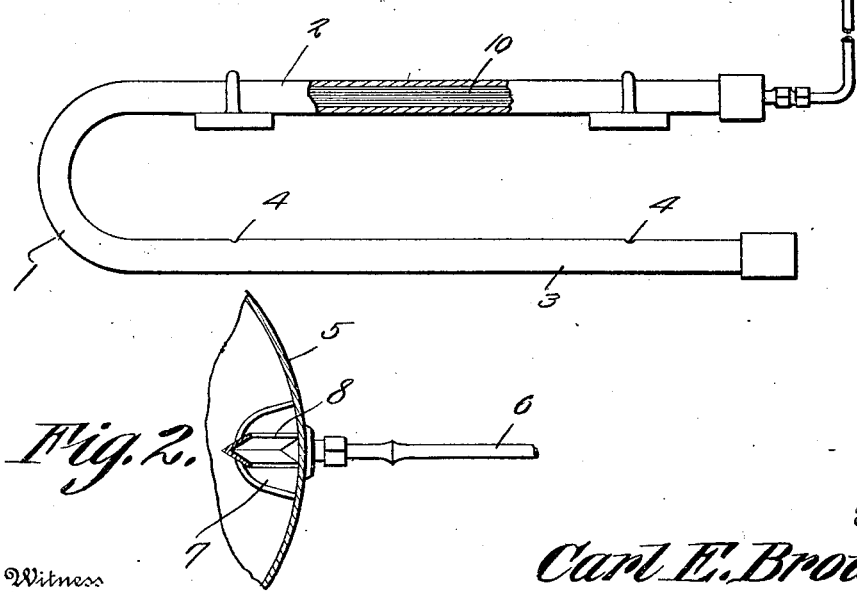

Figure 1 is a side elevation showing a device embodying the invention, parts appearing in section; Fig. 2 is a fragmental cross section on the line 2—2 of Fig. 1.

The numeral 1 denotes a burner of any desired kind, including a generator 2 and a tube 3 having combustion orifices 4. The numeral 5 marks a fuel tank. A conduit 6 leads from the fuel tank 5 to the generator 2. A pocket 7 is secured to the inner wall of the tank 5 about the end of the conduit 6. The numeral 8 denotes a trough, disposed at an incline in the fuel tank 5, the trough being open from end to end, upon its upper side. One end of the trough 8 is supported in the pocket 7, the other end of the trough being supported on the side wall of the tank. The generator 2 ordinarily contains a plurality of wires 10, dividing the generator into a plurality of relatively small passages.

In practical operation, a small quantity of water may be placed in the open sided trough 8, above the level of the fuel in the tank, by means of a medicine dropper or a spoon. Because the water is heavier than the oil in the tank, the water will flow downwardly along the trough 8, into the pocket 7, through the conduit 6 and into the generator 2, accomplishing a removal of any carbon deposit which may have accumulated in the generator. The trough 8 is removable and, therefore, saving when the carbon is being removed, the interior of the fuel tank 5 is not encumbered by the trough. It is to be observed that the trough 8 is V-shaped in cross section, and, on this account, a relatively small quantity of water may be conveyed into the generator 2 and effect the desired result, the drops of water following along the line defined by the relatively sharp transverse angle in the trough 8.

Having thus described the invention, what is claimed is:

In a device of the class described, a burner comprising a generator; a fuel tank; a conduit leading from the tank to the generator; a pocket in the tank about one end of the conduit; and an inclined trough in the tank, the trough being open upon its upper side, one end of the trough being supported on the tank, and the other end of the trough being supported on the pocket.

In testimony that I claim the foregoing as my own, I have hereto affixed my signature in the presence of two witnesses.

CARL E. BROWN.

Witnesses:
HAROLD W. CLY,
L. G. LATHAM.

Copies of this patent may be obtained for five cents each, by addressing the "Commissioner of Patents, Washington, D. C."